United States Patent
Modha

(10) Patent No.: US 7,096,321 B2
(45) Date of Patent: Aug. 22, 2006

(54) METHOD AND SYSTEM FOR A CACHE REPLACEMENT TECHNIQUE WITH ADAPTIVE SKIPPING

(75) Inventor: Dharmendra S. Modha, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 413 days.

(21) Appl. No.: 10/690,410

(22) Filed: Oct. 21, 2003

(65) Prior Publication Data

US 2005/0086437 A1 Apr. 21, 2005

(51) Int. Cl.
   *G06F 12/00* (2006.01)
(52) U.S. Cl. .................. 711/134; 711/133; 711/129; 711/110
(58) Field of Classification Search ........... 711/134, 711/133
   See application file for complete search history.

(56) References Cited

U.S. PATENT DOCUMENTS

| | | | |
|---|---|---|---|
| 5,043,870 A | | 8/1991 | Ditzel et al. |
| 5,285,527 A | | 2/1994 | Crick et al. |
| 5,584,009 A | | 12/1996 | Garibay, Jr. et al. |
| 5,619,675 A | * | 4/1997 | De Martine et al. ........ 711/133 |
| 5,649,156 A | * | 7/1997 | Vishlitzky et al. ......... 711/136 |
| 6,438,651 B1 | * | 8/2002 | Slane ........................ 711/118 |
| 6,601,143 B1 | * | 7/2003 | Lamparter .................. 711/134 |
| 6,654,856 B1 | * | 11/2003 | Frank ........................ 711/133 |

OTHER PUBLICATIONS

Improving Disk Cache Hit-Ratios Through Cache Partitioning. Dominique Thiebaut and Herold S. Stone. Jan. 12, 1990 IEEE Log No. 9105059. pp. 665-676.*
LRFU: A Spectrum of policies that Subsumes that Least Recently Used and Least Frequently Used Policies. By Donghee Lee et al. Mar. 10, 2000, IEEE Log No. 111694. pp. 1352-1361.*
A study of Database Buffer Management Approaches: Toward the Development of a Data Mining Based Strategy. By Ling Feng et al. 0-7803-4778-1/98 1998 IEEE. pp. 2715-2719.*

* cited by examiner

*Primary Examiner*—Mano Padmanabhan
*Assistant Examiner*—Kaushik Patel
(74) *Attorney, Agent, or Firm*—Gibb I.P. Law Firm, LLC; Mark McCabe, Esq.

(57) ABSTRACT

A method, system, and program storage medium for adaptively managing pages in a cache memory included within a system having a variable workload, comprising arranging a cache memory included within a system into a circular buffer; maintaining a pointer that rotates around the circular buffer; maintaining a bit for each page in the circular buffer, wherein a bit value 0 indicates that the page was not accessed by the system since a last time that the pointer traversed over the page, and a hit value 1 indicates that the page has been accessed since the last time the pointer traversed over the page; and dynamically controlling a distribution of a number of pages in the cache memory that are marked with bit 0 in response to a variable workload in order to increase a hit ratio of the cache memory.

28 Claims, 4 Drawing Sheets

METHOD AND SYSTEM FOR A CACHE REPLACEMENT TECHNIQUE WITH ADAPTIVE SKIPPING

BACKGROUND OF THE INVENTION

1. Field of the Invention

The present invention generally relates to cache operations within computer systems, and more particularly to a cache replacement technique with adaptive skipping.

2. Description of the Related Art

Caching is a fundamental problem in computer science. Modern computational infrastructure designs are rich in examples of memory hierarchies where a fast, but expensive main ("cache") memory is placed in front of an inexpensive, but slow auxiliary memory. Caching algorithms manage the contents of the cache so as to improve the overall performance. In particular, cache algorithms are of tremendous interest in databases, virtual memory management, and storage systems, etc., where the cache is RAM and the auxiliary memory is a disk subsystem.

For simplicity, it is assumed that both the cache and the auxiliary memory are managed in discrete, uniformly-sized units called "pages". If a requested page is present in the cache, then it can be served quickly resulting in a "cache hit". On the other hand, if a requested page is not present in the cache, then is must be retrieved from the auxiliary memory resulting in a "cache miss". Usually, latency on a cache miss is significantly higher than that on a cache hit. Hence, caching algorithms focus on improving the hit ratio. Historically, the assumption of "demand paging" has been used to study cache algorithms. Under demand paging, a page is retrieved from the auxiliary memory to the cache only on a cache miss. In other words, demand paging precludes speculatively pre-fetching pages. Under demand paging, the only question of interest is: When the cache is full, and a new page must be inserted in the cache, which page should be replaced?

Digital microprocessors use cache memory to hold data likely to be needed in the near future. Cache memory is comparatively fast and is a local memory. Caching usually occurs when data or other instructions are retrieved from the main memory to be used by the microprocessor, they are also stored in the cache. Typically, the cache is constructed from a random access, read/write memory block (RAM), which can access a single stored object, referred to a line, in a single processor cycle. Preferably, the cache size matches the processor cycle time and is read or written during a given cycle. A server can be configured to receive a stream of requests from clients in a network system to read from or write to a disk drive in the server. These requests form the "workload" for the server.

Each line in the cache memory contains the data being saved and the address of the data in the main memory (the tag). An example of a simple cache 210 is illustrated in the block diagram of FIG. 1. When the microprocessor makes a reference to the main memory, a part of the reference address, referred to as the index, accesses a single line stored in the cache RAM 212. A "hit" occurs if the tag of the accessed line in the cache 210 matches the reference address of the referenced data. When this happens the cache RAM 212 immediately supplies the line to the microprocessor. However, a "miss" occurs if the tag of the accessed line in the cache 210 does not match the reference address of the referenced data. When this happens the address is sent to the main memory to retrieve the requested line. When the main memory sends the line to the microprocessor, it is written into the cache RAM 212 using the same index as the original look-up, along with its tag. However, because the main memory is much slower than the microprocessor, a delay occurs during this retrieval process.

Additionally, cache memory is used when data is written from a host computer to a long-term data storage device such as a disk drive. Here, data may be written to cache memory in which it is temporarily held with an indication that the data must be written to longer term data storage when the data storage system is able to perform this write operation. When cache memory is used to temporarily delay write pending data, memory storage locations are removed from the main memory locations generally available to the data storage system in which data may be held pending use by the host.

Traditionally, under the assumption of demand paging, a cache technique termed the least recently used (LRU) has been used. When the cache is full, and a page must be demoted to make for a new page, LRU removes the least recently used page from the cache. The LRU technique is simple to implement, has low space and time overhead, and it captures "clustered locality of reference" or "recency" property of workloads. However, LRU has two main disadvantages: (i) it does not capture pages with "high frequency" or "long-term-utility" and (ii) it is not resistant to scans which are a sequence of one-time-use-only read/write requests.

Recently, under the assumption of demand paging, a cache technique termed the Adaptive Replacement Cache (ARC) has been used (Nimrod Megiddo and D. S. Modha, ARC: A Self-tuning, Low Overhead Replacement Cache, Proc. 2nd USENIX Conference on File and Storage Technologies (FAST 03), San Francisco, Calif. 115-130, 2003), the complete disclosure of which is herein incorporated by reference. Comparatively, this caching technique has low computational overhead similar to LRU updating schemes, its space overhead over LRU is negligible, it outperforms LRU for a wide range of workloads and cache sizes, it is self-tuning in that for every workload it dynamically adapts between recency and frequency to increase the hit ratio, and it is scan-resistant, and, hence, avoids cache pollution due to sequential workloads.

The below-referenced U.S. Patents disclose embodiments that were satisfactory for the purpose for which they were intended. The disclosures of the below-referenced prior U.S. Patents, in their entireties, are hereby expressly incorporated by reference into the present invention for purposes including, but not limited to, indicating the background of the present invention and illustrating the state of the art.

U.S. Pat. No. 5,285,527 discloses a predictive cache that attempts to guess which instructions will be used by a processor. U.S. Pat. No. 5,043,870 deals with a stack cache inside a processor and provides solutions of how to allocate limited machine registers inside a processor. U.S. Pat. No. 5,584,009 provides a system and method of retiring stored data from a write buffer. CLOCK is a cache replacement technique that is widely used in databases and computer operating systems, see, for example, Andrew S. Tanenbaum and A. S. Woodhull Operating Systems: Design and Implementation, Prentice-Hall, 1997, the complete disclosure of which is herein incorporated by reference. Page replacement in cache occurs when there are no free frames available, and the operating system must replace (evict) a page (victim), removing it from memory to reside only on disk (back store). With regards to replacement techniques, the goal is for the replacement technique to choose the best victim, with the metric for the "best" reducing the fault rate. In a clock replacement technique, a circular queue is maintained with a pointer to the next candidate (clock hand). At fault time operations occur including scanning around the clock, looking for page with usage bit of zero (victim), and clearing usage bits as they are passed. Thus, it is known whether or not a page has been used since the last time the bits were cleared. However, CLOCK suffers from some limitations such as lack of resistance to scans, low performance, and disregard for frequency. Therefore, there is a need for a new cache replacement technique that dynamically tunes itself to adapt to an evolving workload, is scan-resistant, and outperforms CLOCK. Moreover, in the same way that ARC improved on LRU while using the same data structures that are used by LRU, there is a pressing need for a technique like ARC that improves upon CLOCK while using the same data structures that are used by CLOCK.

SUMMARY OF THE INVENTION

The invention provides a method, system, and program storage medium for adaptively managing pages in a cache memory included within a system having a variable workload comprising arranging a cache memory included within a system into a circular buffer; maintaining a pointer that rotates around the circular buffer; maintaining a bit for each page in the circular buffer, wherein a first bit valve indicates that the page was not accessed by the system since a last time that the pointer traversed over the page, and a second bit value indicates that the page has been accessed since the last time the pointer traversed over the page; and dynamically controlling a distribution of a number of pages in the cache memory that are marked with the first bit value in response to a variable workload in order to increase a hit ratio of the cache memory.

The method further comprises maintaining a skipping parameter value; and choosing pages to replace by moving the pointer around the circular buffer until a page that is marked with the first bit value is found, wherein while the pointer is moving around the circular buffer, if a page marked with the second bit value is found when remarking the page with the first bit value of since either a movement started or since a last page was marked, a determination is made that the skipping parameter value has been reached.

Also, the method comprises maintaining a FIFO history list, wherein the FIFO history list includes recently evicted pages from the circular buffer. Additionally, the method comprises adaptively maintaining a target size for the FIFO history list that is exactly the number of pages that are marked with the second bit value at any given time. The method further comprises maintaining a hit parameter value that is incremented when a hit is observed in the circular buffer on a page which is marked with 1 and decremented when a hit is observed on the FIFO history list. Furthermore, the method comprises adaptively determining the skipping parameter value to ensure that the number of pages in the circular buffer that are marked with the second bit value are equal to the hit parameter value.

In another embodiment, the invention provides a system for adaptively managing pages in a cache memory included within the system having a variable workload comprising a circular buffer comprising the a cache memory; a pointer that rotates around the circular buffer; a bit marker operable for marking each page in the circular buffer with a bit value, wherein a first bit value indicates that the page was not accessed by the system since a last time that the pointer traversed over the page, and a second bit value indicates that the page has been accessed since the last time the pointer traversed over the page; and a first controller operable for dynamically controlling a distribution of a number of pages in the cache memory that are marked with the first bit value in response to a variable workload in order to increase a hit ratio of the cache memory.

The system further comprises a skipping parameter value; and a second controller operable for choosing pages to replace by moving the pointer around the circular buffer until a page that is marked with the first bit value is found, wherein while the pointer is moving around the circular buffer, if a page marked with the second bit value is found then remarking the page with the first bit value if since either a movement started or since a last page was marked, a determination is made that the skipping parameter value has been reached. Additionally, the system comprises a FIFO history list, wherein the FIFO history list includes recently evicted pages from the circular buffer.

Moreover, the system comprises a third controller operable for maintaining a target size for the FIFO history list that is exactly the number of pages that are marked with the second bit value at any given time. The system also includes a counter operable for maintaining a hit parameter value that is incremented when a hit is observed in the circular buffer on a page which is marked with 1 and decremented when a hit is observed on the FIFO history list. Furthermore, the system comprises a calculator operable for adaptively determining the skipping parameter value to ensure that the number of pages in the circular buffer that are marked with the second bit value are equal to the hit parameter value.

The invention further comprise a system and method of adaptively managing pages in a cache memory included within a circular buffer in a system having a variable workload, wherein the method comprises assigning a bit value for the pages in the circular buffer, wherein a first bit value indicates that the pages have not been accessed by the system since a previous predetermined time, and wherein a second bit value indicates that the pages have been accessed by the system since a previous predetermined time; converting the first bit value to the second bit value for selected pages; and controlling a distribution of a number of pages in the cache memory that are marked with the first bit value in response to a variable workload in order to increase a hit ratio of the cache memory, wherein the previous predetermined time includes the previous time the page was assigned the bit value.

These, and other aspects and advantages of the invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

The invention will be better understood from the following detailed description with reference to the drawings, in which.

DETAILED DESCRIPTION OF PREFERRED EMBODIMENTS OF THE INVENTION

Figure 1:
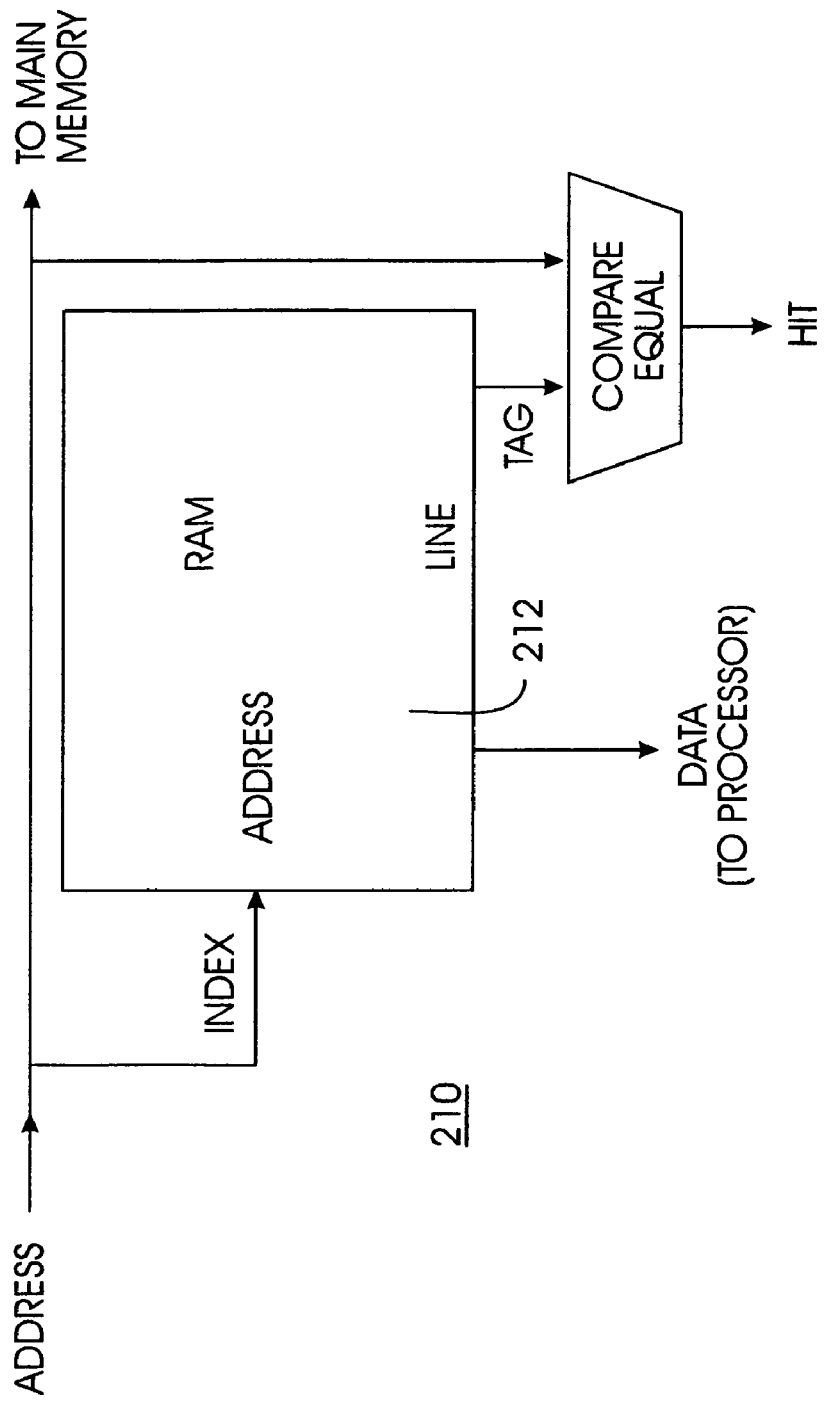
FIG. 1 is a block diagram of a conventional cache memory system.

The present invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Description of well-known components and processing techniques are omitted so as to not unnecessarily obscure the present invention. The examples used herein are intended merely to facilitate an understanding of ways in which the invention may be practiced and to further enable those of skill in the art to practice the invention. Accordingly, the examples should not be construed as limiting the scope of the invention.

The invention includes a new cache replacement technique, namely, CLOCK with Adaptive Skipping (CAS) that dynamically tunes itself to adapt to an evolving workload, is scan-resistant, and uniformly out-performs CLOCK. The invention involves cache replacement in virtual memory, operating systems, databases, and storage controllers.

Referring now to the drawings and more particularly to FIGS. 2–5, there are shown preferred embodiments of the invention. According to the invention, C denotes a circular buffer containing c pages in cache. Moreover, $n_0$ denotes pages in C that are marked as 0 (or not recently used). Also, $n_1$ denotes pages in C that are marked as 1 (or recently used). While the cache is still warming-up (filling-up), the following holds true: $n_0+n_1<c$, and, once the cache is full: $n_0+n_1=c$.

Additionally, according to the invention H denotes a history queue that contains recently evicted pages from C, and is maintained as a FIFO. Furthermore, h denotes the actual number of pages in H. The invention maintains a target size for H that is exactly equal to $n_1$. F denotes a free segment queue that contains evicted history pages from H, and is maintained as a FIFO. The queue F contains exactly c–h entries at any time.

The invention uses an adaptation parameter, s, or skip parameter. MAX denotes a user-specified parameter. Typically, MAX is set to 32 or 64, etc. Accordingly, the invention ensures that $0 \leq s \leq MAX$. The invention uses a parameter p such that $0 \leq p < c-1$. This parameter will be used to determine s. The invention implements the following routines:

```
CAS(c) INITIALIZE C = H = F = Ø, n₀ = n₁ = h = p = 0, s = 0.
x - requested page.
Case I. x ∈ C.
    If (x is of type 0),
        n₁+ + , n₀ - -. Now, mark x as of type 1.
    else // x is of type 1
        Set p = min{c - 1, p + 1}.
    endif.
Case II. x ∈ H
    Set p = max{0, p - 1}. REPLACE(c, s, p). Mark x as of type 1, and insert it into C at
    the location emptied by the freed buffer. Increment, n₁ + +.
    Decrement, h - -
Case III. x ∈C ∪ H.
    If (n₀ + n₁ = = c), // cache is full
        REPLACE(c, s, p).
    else // cache is warming-up
        just grab a free buffer!
    endif.
    Mark x as of type 0, and insert it into C at the location emptied by the freed buffer.
    Increment, n₀ + +.
SUBROUTINE ADAPT(c, s, p)
Set q = c/(c - p) - 1.
If (q > MAX), s = MAX.
elseif (q = = 0 and n₁ < p), s = 1.
else s = 0.
endif.
SUBROUTINE REPLACE(c, s, p)
ADAPT(c, s, p).
Set s' = s.
While (a page of type 0 is not found)
    if s' = = 0, s' - -
    else, set the type of page to 0, s' = s, n₀ + + and n₀ - -.
    endif
endwhile
Now, free the page of type 0 that was found. Grab an entry from F, and use that entry to insert
the name of the freed buffer on top of H, and h + +.
While (h > n₁),
    move history pages from H to F.
endwhile
```

In other words, any requested page must be either in the circular list C or cache history list H or it may be in neither of these two lists. The invention treats these three cases separately. According to Case I, the requested age is in the circular list C. In this case, it is determined if the page is of type 0 or of type 1. If the page is of type 0, then it is changed to type 1. Also, if the page is of type 0, then the counter $n_1$ is incremented, while $n_0$ is decremented. If the page is of the type 1, then parameter p is incremented by one.

Next, according to Case II, if the requested page is in the history list H, then the parameter p is decremented by one.

Also, because this is a cache miss, the subroutine REPLACE (c, s, p) is run to free up a page from the cache. Then, the page x is marked as of type 1 and inserted into the cache behind the circulating clock hand. Also, the counter $n_1$ is incremented by one, and the size of the history list H is decremented by one.

Finally, in Case III, the requested page is neither in C nor H. In this case, if the cache is full, then the subroutine REPLACE(c, s, p) is run to free up a cache page. If the cache is not full, then a free buffer is selected. In either case, the requested page is marked as type 0 and is inserted into the location emptied by the freed buffer. Also, the counter $n_0$ is incremented by one. Furthermore, the subroutine ADAPT(c, s, p) computes the skip parameter s as a function of the parameter p. Moreover, the subroutine REPLACE(c, s, p) replaces a page of type 0 from the cache. While searching for the page of type 0, if the circulating clock hand encounters pages of type 1, then every $s^{th}$ page is converted to type 0 from type 1. In other words, the circulating clock hand adaptively skips over some pages of type 1.

Figure 2:
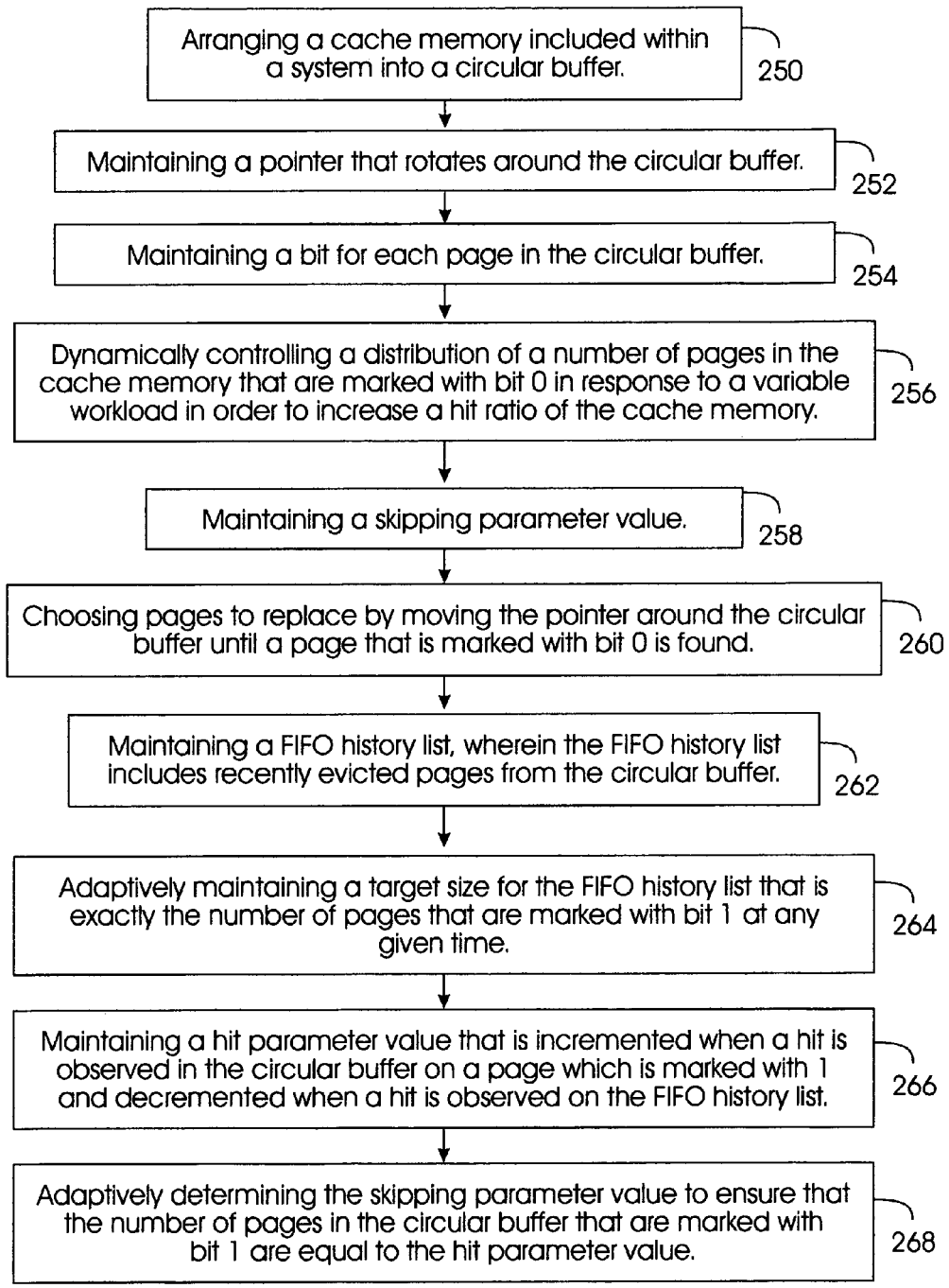
FIG. 2 is a flow diagram illustrating a preferred method of the invention.

A flowchart illustrating the method of the invention is illustrated in FIG. 2, wherein the method of adaptively managing pages in a cache memory included within a system having a variable workload comprises arranging 250 a cache memory included within a system into a circular buffer; maintaining 252 a pointer that rotates around the circular buffer; maintaining 254 a bit for each page in the circular buffer, wherein a bit value 0 indicates that the page was not accessed by the system since a last time that the pointer traversed over the page, and a bit value 1 (second bit value) indicates that the page has been accessed since the last time the pointer traversed over the page; and dynamically controlling 256 a distribution of a number of pages in the cache memory that are marked with bit value 0 (first bit value) in response to a variable workload in order to increase a hit ratio of the cache memory.

The invention accomplishes this by attempting to maintain the counter $n_1$ to a certain target p. Specifically, the invention determines the parameter p according to the operation: $0 \leq p < c-1$, as described above. Once the parameter p is known, the invention uses subrouting ADAPT(c, s, p) to determine the skip parameter s, as described above. Finally equipped with the parameter s, the subroutine REPLACE(c,s, p) adaptively skips over pages of type 1 in accordance with the value s. This has the effect of driving the counter $n_1$ to the target p. Moreover, the target p is dynamically tuned by the invention by observing an evolving workload, and, as a result, the parameter skip s is also dynamically determined by the invention.

The method further comprises maintaining 258 a skipping parameter value; and choosing 260 pages to replace by moving the pointer around the circular buffer until a page that is marked with bit 0 is found, wherein while the pointer is moving around the circular buffer, if a page marked with bit 1 is found then remarking the page with bit 0 if since either a movement started or since a last page was marked, a determination is made that the skipping parameter value has been reached.

Also, the method comprises maintaining 262 a FIFO history list, wherein the FIFO history list includes recently evicted pages from the circular buffer. Additionally, the method comprises adaptively maintaining 264 a target size for the FIFO history list that is exactly the number of pages that are marked with bit 1 at any given time. The method further comprises maintaining 266 a hit parameter value that is incremented when a hit is observed in the circular buffer on a page which is marked with bit value 1 and decremented when a hit is observed on the FIFO history list. Furthermore, the method comprises adaptively determining 268 the skipping parameter value to ensure that the number of pages in the circular buffer tat are marked with bit 1 are equal to the hit parameter value.

Figure 3:
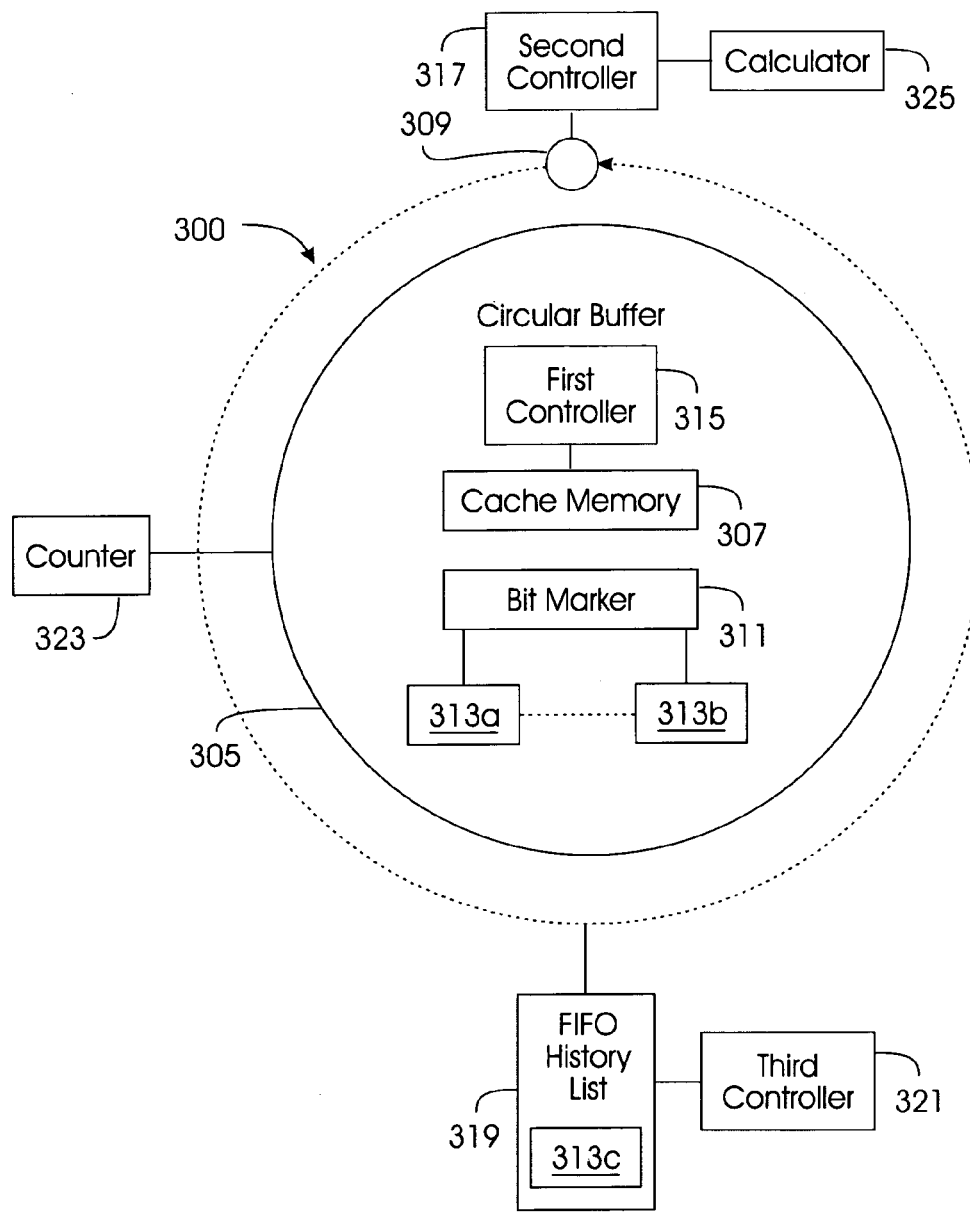
FIG. 3 is a block diagram according to the invention.

In another embodiment illustrated in FIG. 3, the invention provides a system 300 for adaptively managing pages 313a, 313b in a cache memory 307 included within the system 300 having a variable workload comprising a circular buffer 305 comprising the a cache memory 307; a pointer 309 that rotates around the circular buffer 305; a bit marker 311 operable for marking each page 313a, 313b in the circular buffer 305 with a bit value, wherein a bit value 0 (first bit value) indicates that the page 313a was not accessed by the system 300 since a last time that the pointer 309 traversed over the page 313a, and a bit value 1 (second bit value) indicates that the page 313b has been accessed since the last time the pointer 309 traversed over the page 313b; and a first controller 315 operable for dynamically controlling a distribution of a number of pages in the cache memory 307 that are marked with bit value 0 in response to a variable workload in order to increase a hit ratio of the cache memory 307.

The system 300 further comprises a skipping parameter value; and a second controller 317 operable for choosing pages to replace by moving the pointer 309 around the circular buffer 305 until a page 313a that is marked with bit value 0 is found, wherein while the pointer 309 is moving around the circular buffer 305, if a page 313b marked with bit value 1 is found then remarking the page with bit 0 if since either a movement started or since a last page was marked, a determination is made that the skipping parameter value has been reached. Additionally, the system 300 comprises a FIFO history list 319, wherein the FIFO history list 319 includes recently evicted pages 313c from the circular buffer 305.

Moreover, the system 300 comprises a third controller 321 operable for maintaining a target size for the FIFO history list 319 that is exactly the number of pages that are marked with bit 1 at any given time. The system 300 also includes a counter 323 operable for maintaining a hit parameter value that is incremented when a hit is observed in the circular buffer 305 on a page 313b, which is marked with bit value 1 and decremented when a hit is observed on the FIFO history list 319. Furthermore, the system 300 comprises a calculator 325 operable for adaptively determining the skipping parameter value to ensure that the number of pages 313b in the circular buffer 305 that are marked with bit value 1 are equal to the hit parameter value.

TABLE 1

| Workload | Space (MB) | LRU | ARC | CLOCK | CAS |
|---|---|---|---|---|---|
| P1 | 16 | 16.55 | 28.26 | 17.34 | 24.97 |
| P2 | 16 | 18.47 | 27.38 | 19.22 | 25.11 |
| P3 | 16 | 3.57 | 17.12 | 3.74 | 13.62 |
| P4 | 16 | 5.24 | 11.24 | 5.25 | 7.55 |
| P5 | 16 | 6.73 | 14.27 | 6.78 | 11.53 |
| P6 | 16 | 4.24 | 23.84 | 4.36 | 21.64 |
| P7 | 16 | 3.45 | 13.77 | 3.62 | 10.78 |
| P8 | 16 | 17.18 | 27.51 | 17.99 | 25.17 |
| P9 | 16 | 8.28 | 19.73 | 8.49 | 17.90 |
| P10 | 16 | 2.48 | 9.46 | 2.52 | 7.22 |
| P11 | 16 | 20.92 | 26.48 | 21.51 | 23.85 |
| P12 | 16 | 8.93 | 15.94 | 9.18 | 14.30 |
| P13 | 16 | 7.83 | 16.60 | 8.26 | 13.80 |
| P14 | 16 | 15.73 | 20.52 | 15.98 | 18.82 |
| DS1 | 1024 | 11.65 | 22.52 | 11.86 | 25.38 |

TABLE 1-continued

| Workload | Space (MB) | LRU | ARC | CLOCK | CAS |
|---|---|---|---|---|---|
| SPC1 | 4096 | 9.19 | 20.00 | 20.00 | 16.72 |
| Merge(S) | 4096 | 27.62 | 40.44 | 29.04 | 34.74 |

Table 1 illustrates a comparison of LRU, ARC, CLOCK, and CAS (the invention) for various workloads. As shown in Table 1, ARC generally outperforms LRU, sometimes quite dramatically, and CAS outperforms CLOCK, also sometimes quite dramatically, The column "Workload" summarizes various traces that were used to measure and quantify the benefits of the invention. These traces capture disk accesses by databases, web servers, NT workstations, and a synthetic benchmark for storage controllers. All traces are representative of workloads seen by storage controllers, disks, or RAID controllers. The traces P1–P14 are collected from workstations running Windows NT by using Vtrace, which captures disk operations through the use of device filters. Experimentally, the traces were gathered over several months. The page size for these traces is 512 bytes. The trace DS1 is removed from a database server running at a commercial site running an ERP application on top of a commercial database. Moreover, the trace is seven days long. SPC1 is a synthetic benchmark trace that contains long sequential scans in addition to random accesses. The page size for this trace is 4 KB. The trace Merge(S) is obtained by merging three traces S1, S2, and S3 using time stamps on each of the requests, where the three traces S1, S2, and S3 are disk read accesses initiated by a large commercial search engine in response to various web search requests. The trace S1 is captured over a period of an hour, S2 is captured over approximately four hours, and S3 is captured over approximately six hours. The page size for these traces is 4 KB.

A cache replacement technique is often measured by its hit ratio, which is the fraction of the requests that are found in the cache. The columns LRU, ARC, CLOCK, and CAS represent hit ratios that are reported in percentages, where a higher hit ratio is better than a lower hit ratio. The table clearly shows that CAS has a hit ratio that is better than CLOCK, and sometimes dramatically better. The table also shows that the hit ratio of CAS is comparable to that of ARC.

Figure 4:
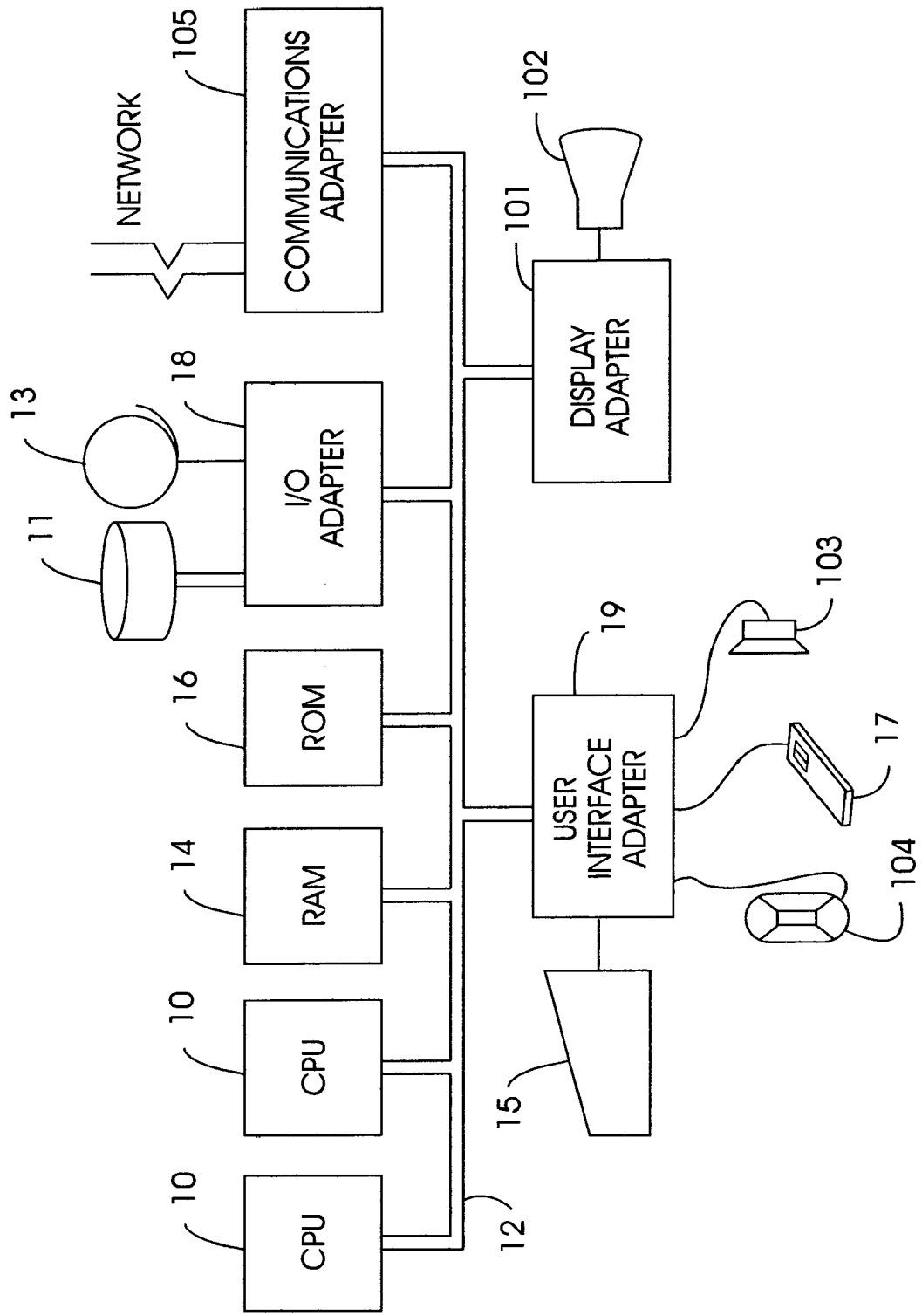
FIG. 4 is a systems diagram according to the invention.

A representative hardware environment for practicing the present invention is depicted in FIG. 4, which illustrates a typical hardware configuration of an information handling/computer system in accordance with the present invention, having at least one processor or central processing unit (CPU) 10. The CPUs 10 are interconnected via system bus 12 to random access memory (RAM) 14, read-only memory (ROM) 16, an input/output (I/O) adapter 18 for connecting peripheral devices, such as disk units 11 and tape drives 13, to bus 12, user interface adapter 19 for connecting keyboard 15, mouse 17, speaker 103, microphone 104, and/or other user interface devices such as a touch screen device (not shown) to bus 12, communication adapter 105 for connecting the information handling system to a data processing network, and display adapter 101 for connecting bus 12 to display device 102. A program storage device readable by the disk or tape units is used to load the instructions, which operate the invention, which is loaded onto the computer system.

Essentially, the invention provides a cache replacement technique which uses counters to designate pages stored in cache memory as either recently used pages or not recently used pages, and chooses pages to replace by moving a pointer around a circular buffer until a page that is marked with a first bit value is found, wherein while the pointer is moving around the circular buffer, if a page marked with a second bit value is found it is remarked with a first bit value if since either a movement started or since the last time the page was marked, a determination is made that a predetermined skipping parameter value has been reached.

The invention provides a method of adaptively managing pages in a cache memory included within a circular buffer in a system having a variable workload, wherein the method comprises assigning a bit value for the pages in the circular buffer, wherein a first bit value indicates that the pages have not been accessed by the system since a previous predetermined time, and wherein a second bit value indicates that the pages have been accessed by the system since a previous predetermined time; converting the first bit value to the second bit value for selected pages; and controlling a distribution of a number of pages in the cache memory that are marked with the first bit value in response to a variable workload in order to increase a hit ratio of the cache memory, wherein the previous predetermined time includes the previous time the page was assigned the bit value.

Moreover, the invention maintains the pages in the cache in a circular buffer, which is equipped with a rotating clock hand (pointer) that circulates around a clock looking for pages to evict. The invention maintains a history buffer that remembers recently evicted pages from the cache. The invention also maintains a skip parameter that affects the behavior of the rotating clock hand. Furthermore, the invention uses bits to designate pages stored in cache memory as either recently used pages that are potentially important or not recently used pages that are potentially discardable. The not recently used pages are assigned a first bit value, while the recently used pages are assigned a second bit value. A newly inserted page in the cache is assigned a first bit value, and if the page is subsequently accessed while it is in the cache, then the first bit value is changed to the second bit value. The rotating clock hand seeks a page marked with the first bit value for cache eviction, but while it is searching for such a page, if the clock hand encounters page marked with the second bit value, then depending upon the value of the skip parameter some of the encountered pages with the second bit value are converted into pages with the first bit value by reassigning the first bit value into the second bit value.

The invention controls a distribution of the number of pages in the cache memory that are marked with the first bit value in response to a variable workload in order to increase the hit ratio of the cache memory. In particular, the aforesaid control comprises increasing the number of pages in the cache memory that are marked with the first bit value if a page in the history buffer is accessed, and decreasing the number of pages in the cache memory that are marked with the first bit value if a page in the cache memory with a second bit value is accessed While the invention has been described in terms of preferred embodiments, those skilled in the art will recognize that the invention can be practiced with modification within the spirit and scope of the appended claims.

What is claimed is:

1. A method of adaptively managing pages in a cache memory included within a system having a variable workload, said method comprising:
  arranging a cache memory included within said system into a circular buffer;
  maintaining a pointer that rotates around said circular buffer;

maintaining a skipping parameter value;
maintaining a bit for each page in said circular buffer, wherein a first bit value indicates that said page was not accessed by said system since a last time that said pointer traversed over said page, and a second bit value indicates that said page has been accessed since said last time said pointer traversed over said page;
dynamically controlling a distribution of a number of pages in said cache memory that are marked with said first bit value in response to a variable workload in order to increase a hit ratio of said cache memory; and
choosing pages to replace by moving said pointer around said circular buffer until a page that is marked with said first bit value is found, wherein while said pointer is moving around said circular buffer, if a page marked with said second bit value is found then remarking said page with said first bit value if since either a movement started or since a last page was marked, a determination is made that said skipping parameter value has been reached.

2. The method of claim 1,
wherein the dynamic controlling process is self-controlling.

3. The method of claim 1, further comprising maintaining a FIFO history list, wherein said FIFO history list includes recently evicted pages from said circular buffer.

4. The method of claim 3, further comprising adaptively maintaining a target size for said FIFO history list that is exactly the number of pages that are marked with said second bit value at any given time.

5. The method of claim 4, further comprising maintaining a hit parameter value that is incremented when a hit is observed in said circular buffer on a page which is marked with said second bit value and decremented when a hit is observed on said FIFO history list.

6. The method of claim 5, further comprising adaptively determining said skipping parameter value to ensure that the number of pages in said circular buffer that are marked with said second bit value are equal to said hit parameter value.

7. A system for adaptively managing pages in a cache memory included within said system having a variable workload comprising:
a circular buffer comprising said a cache memory;
a pointer that rotates around said circular buffer;
a skipping parameter value;
a bit marker operable for marking each page in said circular buffer with a bit value, wherein a first bit value indicates that said page was not accessed by said system since a last time that said pointer traversed over said page, and a second bit value indicates that said page has been accessed since said last time and said pointer traversed over said page;
a first controller operable for dynamically controlling a distribution of a number of pages in said cache memory that are marked with said first bit value in response to a variable workload in order to increase a hit ratio of said cache memory; and
a second controller operable for choosing pages to replace by moving said pointer around said circular buffer until a page that is marked with said first bit value is found, wherein while said pointer is moving around said circular buffer, if a page marked with said second bit value is found then remarking said page with bit 0 if since either a movement started or since a last page was marked, a determination is made that said skipping parameter value has been reached.

8. The system of claim 7,
wherein the dynamic controlling by said first controller is self-controlled.

9. The system of claim 7, further comprising a FIFO history list,
wherein said FIFO history list includes recently evicted pages from said circular buffer.

10. The system of claim 9, further comprising a third controller operable for maintaining a target size for said FIFO history list that is exactly the number of pages that are marked with said second bit value at any given time.

11. The system of claim 10, further comprising a counter operable for maintaining a hit parameter value that is incremented when a hit is observed in said circular buffer on a page which is marked with said second bit value and decremented when a hit is observed on said FIFO history list.

12. The system of claim 11, further comprising a calculator operable for adaptively determining said skipping parameter value to ensure that the number of pages in said circular buffer that are marked with said second bit value are equal to said hit parameter value.

13. A system for adaptively managing pages in a cache memory included within said system having a variable workload comprising:
means for arranging a cache memory included within a system into a circular buffer;
means for maintaining a pointer that rotates around said circular buffer;
means for maintaining a skipping parameter value;
means for maintaining a bit for each page in said circular buffer, wherein a first bit value indicates that said page was not accessed by said system since a last time that said pointer traversed over said page, and a second bit value indicates that said page has been accessed since said last time said pointer traversed over said page;
means for dynamically controlling a distribution of a number of pages in said cache memory that are marked with bit 0 in response to a variable workload in order to increase a hit ratio of said cache memory; and
means for choosing pages to replace by moving said pointer around said circular buffer until a page that is marked with said first bit value is found, wherein while said pointer is moving around said circular buffer, if a page marked with said second bit value is found then remarking said page with said first bit value if since either a movement started or since a last page was marked, a determination is made that said skipping parameter value has been reached.

14. A program storage device readable by computer, tangibly embodying a program of instructions executable by said computer to perform a method of adaptively managing pages in a cache memory included within a system having a variable workload, said method comprising:
arranging a cache memory included within a system into a circular buffer;
maintaining a pointer that rotates around said circular buffer;
maintaining a skipping parameter value;
maintaining a bit for each page in said circular buffer, wherein a first bit value indicates that said page was not accessed by said system since a last time that said pointer traversed over said page, and a second bit value indicates that said page has been accessed since said last time said pointer traversed over said page;
dynamically controlling a distribution of a number of pages in said cache memory that are marked with said first bit value in response to a variable workload in order to increase a hit ratio of said cache memory; and choosing pages to replace by moving said pointer around said circular buffer until a page that is marked with said first bit value is found, wherein while said pointer is moving around said circular buffer, if a page marked with said second bit value is found then remarking said page with said first bit value if since either a movement started or since a last page was marked, a determination is made that said skipping value has been reached.

15. The program storage device of claim 14, wherein the dynamic controlling process is self-controlling.

16. The program storage device of claim 14, further comprising maintaining a FIFO history list, wherein said FIFO history list includes recently evicted pages from said circular buffer.

17. The program storage device of claim 16, further comprising adaptively maintaining a target size for said FIFO history list that is exactly the number of pages that are marked with said second bit value at any given time.

18. The program storage device of claim 17, further comprising maintaining a hit parameter value that is incremented when a hit is observed in said circular buffer on a page which is marked with said second bit value and decremented when a hit is observed on said FIFO history list.

19. The program storage device of claim 18, further comprising adaptively determining said skipping parameter value to ensure that the number of pages in said circular buffer that are marked with said second bit value are equal to said hit parameter value.

20. A method of adaptively managing pages in a cache memory included within a circular buffer in a system having a variable workload, said method comprising:

maintaining a pointer that rotates around said circular buffer;

maintaining a skipping parameter value;

assigning a bit value for the pages in the circular buffer, wherein a first bit value indicates that said pages have not been accessed by the system since a previous predetermined time, and wherein a second bit value indicates that said pages have been accessed by the system since a previous predetermined time;

converting said first bit value to said second bit value for selected pages;

controlling a distribution of a number of pages in the cache memory that are marked with the first bit value in response to a variable workload in order to increase a hit ratio of the cache memory; and choosing pages to replace by moving said pointer around said circular buffer until a page that is marked with said first bit value is found, wherein while said pointer is moving around said circular buffer, if a page marked with said second bit value is found then remarking said page with said first bit value if since either a movement started or since a last page was marked, a determination is made that said skipping parameter value has been reached, wherein the previous predetermined time includes the previous time said page was assigned said bit value.

21. The method of claim 20, wherein the controlling process is self-controlling.

22. The method of claim 20, wherein said first bit value indicates that a page was not accessed by said system since a last time that said pointer traversed over said page, and said second bit value indicates that said page has been accessed since said last time said pointer traversed over said page.

23. The method of claim 21, wherein said skipping parameter value is an adaptation parameter value.

24. The method of claim 23, further comprising maintaining a FIFO history list, wherein said FIFO history list includes recently evicted pages from said circular buffer.

25. The method of claim 24, further comprising adaptively maintaining a target size for said FIFO history list that is exactly the number of pages that are marked with said second bit value at any given time.

26. The method of claim 25, further comprising maintaining a hit parameter value that is incremented when a hit is observed in said circular buffer on a page which is marked with said second bit value and decremented when a hit is observed on said FIFO history list.

27. The method of claim 26, further comprising adaptively determining said skipping parameter value to ensure that the number of pages in said circular buffer that are marked with said second bit value are equal to said hit parameter value.

28. A system for adaptively managing pages in a cache memory included within a circular buffer in a system having a variable workload comprising:

means for maintaining a pointer that rotates around said circular buffer;

means for maintaining a skipping parameter value;

means for assigning a bit value for the pages in the circular buffer, wherein a first bit value indicates that said pages have not been accessed by the system since a previous predetermined time, and wherein a second bit value indicates that said pages have been accessed by the system since a previous predetermined time;

means for converting said first bit value to said second bit value for selected pages;

means for controlling a distribution of a number of pages in the cache memory that are marked with the first bit value in response to a variable workload in order to increase a hit ratio of the cache memory; and means for choosing pages to replace by moving said pointer around said circular buffer until a page that is marked with said first bit value is found, wherein while said pointer is moving around said circular buffer, if a page marked with said second bit value is found then remarking said page with said first bit value if since either a movement started or since a last page was marked, a determination is made that said skipping parameter value has been reached, wherein the previous predetermined time includes the previous time said page was assigned said bit value.

* * * * *